United States Patent [19]

Oogita et al.

[11] Patent Number: 5,065,155
[45] Date of Patent: Nov. 12, 1991

[54] KEY-LOCK SYSTEM

[75] Inventors: Yoshinori Oogita; Sigeaki Masuzawa, both of Nara, Japan

[73] Assignee: Sharp Kabushiki Kaisha, Osaka, Japan

[21] Appl. No.: 425,806

[22] Filed: Oct. 23, 1989

[30] Foreign Application Priority Data

Oct. 28, 1988 [JP] Japan .............................. 63-274240
Nov. 8, 1988 [JP] Japan .............................. 63-283240

[51] Int. Cl.⁵ .......................... H04B 1/00; G06K 7/00
[52] U.S. Cl. ........................ 340/825.56; 340/825.33; 340/825.34; 235/380
[58] Field of Search ............. 340/825.33, 825.34, 340/825.56; 341/22; 235/375, 380, 382.5, 487, 492, 493

[56] References Cited

U.S. PATENT DOCUMENTS 4,667,087 5/1987 Quintana ........................... 235/380
4,670,747 6/1987 Borras et al. .................. 340/825.56

FOREIGN PATENT DOCUMENTS 0241683 10/1988 Japan ................................. 235/487
8901207 2/1989 World Int. Prop. O. ......... 235/375

Primary Examiner—Donald J. Yusko
Assistant Examiner—Dervis Magistre
Attorney, Agent, or Firm—Merchant, Gould, Smith, Edell, Welter & Schmidt

[57] ABSTRACT

A key-lock system and method for use in an IC card with a display portion and the like, which is so arranged to render input from a keyboard, to be in an inhibited state by detecting that a plurality of keys for the keyboard were depressed in a predetermined order, and also to render the inhibited state of input from the keyboard, to be in a released state by detecting that the plurality of keys of the keyboard were depressed in another predetermined order.

6 Claims, 3 Drawing Sheets

KEY-LOCK SYSTEM

BACKGROUND OF THE INVENTION

The present invention generally relates to a key-lock arrangement and more particularly, to a key-lock system to be employed in an IC card provided with a display portion or the like.

By way of example, there is conventionally available an IC card with a display portion capable of inhibiting input (referred to as key-lock hereinafter) from a keyboard as shown in FIG. 5. The known IC card 1 is provided, in its keyboard 2, with a "LOCK" key 3 and a "LOCK RELEASE" key 4. The "LOCK" key 3 is a key for effecting the key-lock, while the "LOCK RELEASE" key is a key for releasing the inhibition of input (referred to as lock release hereinafter) from the keyboard. Thus, the key-lock is effected by depressing the "LOCK" key 3, and the lock release is effected by depressing said "LOCK RELEASE" key 4. A display portion 5 is provided for displaying contents of input from the keyboard 2, etc. or results of calculation and the like.

However, since the key-lock system employed in the above conventional IC card 1 is arranged to effect the key-lock by depressing the "LOCK" key 3, and the lock release by depressing the "LOCK RELEASE" key 4, there are problems as described hereinafter.

More specifically, in the IC card 1 as referred to above, in the case where automatic payment or the like is to be effected by an automatic teller machine (referred to as ATM hereinafter), said IC card 1 is adapted to be fed into the ATM by a rotating roller (not shown). Meanwhile, when an embossed code formed by embossment 6 on the surface of the IC card 1 is to be transferred onto a slip 7 or the like by an imprinter, as shown in FIG. 6, the slip 7 placed on the surface of the IC card 1 formed with the embossed code is depressed by an imprinter roller 8, whereby the embossment 6 which constitutes the embossed code on the surface of said IC card 1 is transferred onto the slip 7.

Accordingly, there are cases where even when the key-lock has been effected through depression of the "LOCK" key 3, since the surface of the IC card 1 is depressed by the rotating roller 8 during feeding of the IC card 1 into the ATM or during transfer of the embossed code by the imprinter roller 8, the "LOCK RELEASE" key 4 provided on the reverse surface of the card 1 is depressed by the roller 8, thus the key-lock being undesirably released. Furthermore, in the case as described above, if the roller 8 further proceeds from the position of the "LOCK RELEASE" key 4, and depresses other numerical keys, such depressed keys are undesirably inputted, thus resulting in erroneous functions.

SUMMARY OF THE INVENTION

Accordingly, an essential object of the present invention is to provide an improved key-lock system for use in an IC card with a display portion or the like, which is free from undesirable releasing of the key-lock state except for a case where lock releasing function is effected.

Another object of the present invention is to provide a key-lock system of the above described type, which is simple in construction and readily incorporated into an IC card or the like at low cost.

In accomplishing these and other objects, according to one aspect of the present invention, there is provided a key-lock system for use in an IC card with a display portion and the like, which is arranged to establish a key-lock state by detecting that a plurality of keys for the keyboard were depressed in a predetermined order, and also, to establish a lock release state by detecting that the plurality of keys of the keyboard were depressed in another predetermined order.

In another aspect of the present invention, the key-lock system is arranged to render input from a keyboard, to be in an inhibited state by detecting that predetermined keys of the keyboard were depressed, and also, to render the inhibited state of input from the keyboard, to be in a released state by detecting that time which has elapsed after the input from the keyboard was rendered to be in the inhibited state, has reached a specified time.

By the above arrangement according to the present invention, an improved key-lock system free from undesirable key-lock releasing has been advantageously presented.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
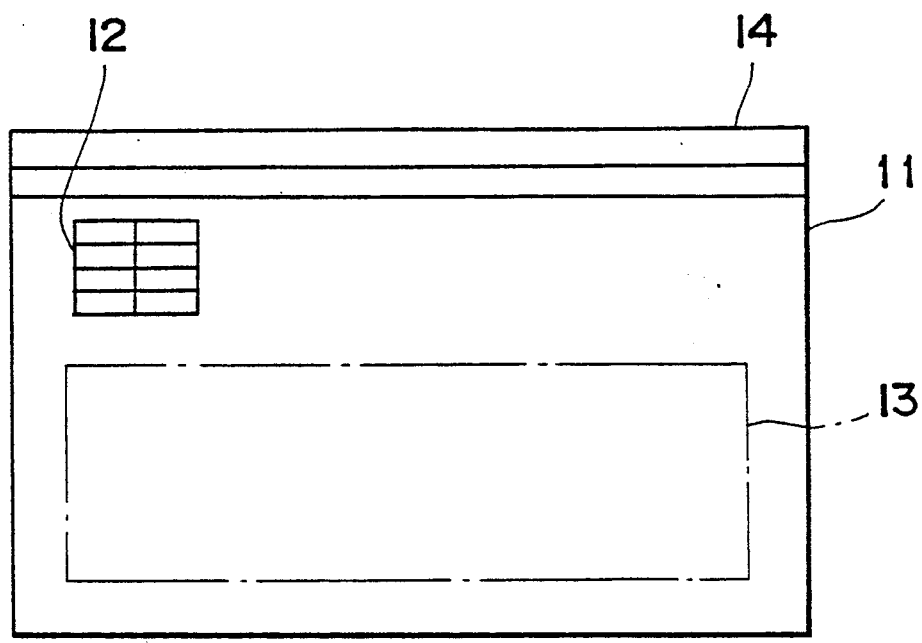
FIG. 1 is a top plan view of a front surface of an IC card provided with a display portion according to one preferred embodiment of the present invention.

Before the description of the present invention proceeds, it is to be noted that like parts are designated by like reference numerals throughout the accompanying drawings.

Figure 2:
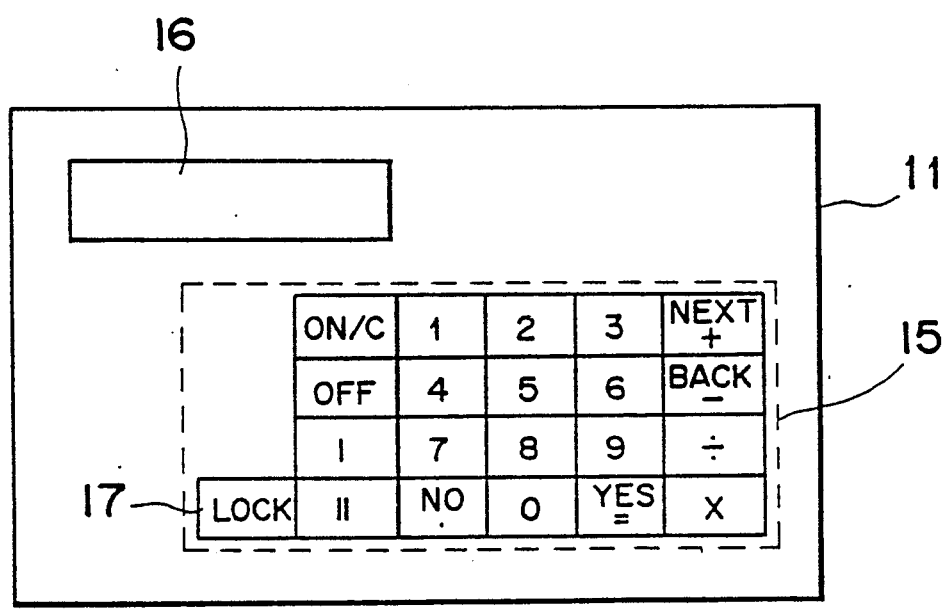
FIG. 2 is a top plan view of a reverse surface of the IC card of FIG. 1.

Referring now to the drawings, there is shown in FIGS. 1 and 2, an IC card 11 provided with a display portion 16 according to one preferred embodiment of the present invention, in which FIG. 1 shows a top plan view on a front surface of said IC card 11, while FIG. 2 shows a top plan view on a reverse surface thereof.

The IC card 11 is provided, on its front surface, with a pin portion 12 including a plurality of pins functioning as contacts for data transmission and reception with respect to an ATM (Automatic teller machine), an embossed code area 13 at which an embossed code is provided for transferring codes such as names or the like onto a slip, etc. by an imprinter (not shown here), and magnetic stripes 14 in which data for using said IC card 11 as a magnetic card are stored.

Meanwhile, on the reverse surface of the IC card 11, there are provided a keyboard 15 including numerical keys, function keys, etc. for inputting recitation numbers and the like for causing said IC card 11 to function, and the display portion 16 for displaying content of data inputted through the keyboard 15 and the pin portion 12 or results of calculations, etc. Moreover, in the keyboard 15, a "LOCK" key 17 is provided for instructing the key-lock or lock release.

The IC card 11 with the display portion 16 as described so far is subjected to the key-lock in a manner as follows.

For effecting the key-lock, the key "1", key "7", key "8" and key "9" are first depressed in the order as the key "1"→key "9", key "7"→key "8", and when "LOCK" key is depressed finally, it is judged that the key "1", key "7", key "8", Key "9", and the "LOCK" key are depressed in the above order, whereby the key-lock is effected to enter the key-lock mode.

Subsequently, for releasing the key-lock, the key "1", key "7", key "8" and key "9" are first depressed in the order as the key "8"→key "7", key "9"→key "1", and when "LOCK" key is depressed finally, it is judged that the key "1", key "7", key "8", key "9" and the "LOCK" key are depressed in the above order, and the key-lock is released to establish the lock release mode.

It is to be noted here that, in the above case, the direction to operate the keys for entering the lock release mode is inverted at the time point for transfer from the key "7" to key "9", and also, at the time point for transfer from the key "9" to key "1" in the direction for arrangement of the keys "1", "7", "8", and "9". On the contrary, the direction in which a roller is displaced when the IC card 11 is inserted into the ATM or when the embossed code of the IC card 11 is transferred by the imprinter, is constant at all times in the direction of arrangement of the keys "1", "7", "8" and "9". Therefore, even if the keys "1", "7", "8" and "9" should be depressed by the roller during insertion of the IC card 11 into the ATM or during transfer of the embossed code of the IC card 11 by the imprinter, the order of depression in that case is different from the order to operate the keys for entering the lock release mode.

Accordingly, in the above practice of the present invention, there is no possibility that the key-lock is released during insertion of the IC card 11 into the ATM or during transfer of the IC card 11 by the imprinter. In other words, the key-lock is not undesirably released for erroneous functions even when the IC card 11 is inserted into the ATM or imprinter.

In the foregoing embodiment, it is so arranged that the key-lock mode is established when the keys "1", "7", "8", "9" and "LOCK" key are depressed in the order as in the key "1"→key "9",→key "7", →key "8"→"LOCK" key, while the lock release mode is entered upon depression of said keys in the order as in the key "8"→key "7"→key "9"→key "1"→"LOCK" key.

However, according to the present invention, it is needless to say that the keys to be operated or the order of operating the keys are not limited to those in the above embodiment, and that the order for operating the keys for entering the lock releasing mode may be only different from the order by which the keys are depressed by the roller during insertion of the IC card 11 into the ATM or imprinter.

Figure 3:
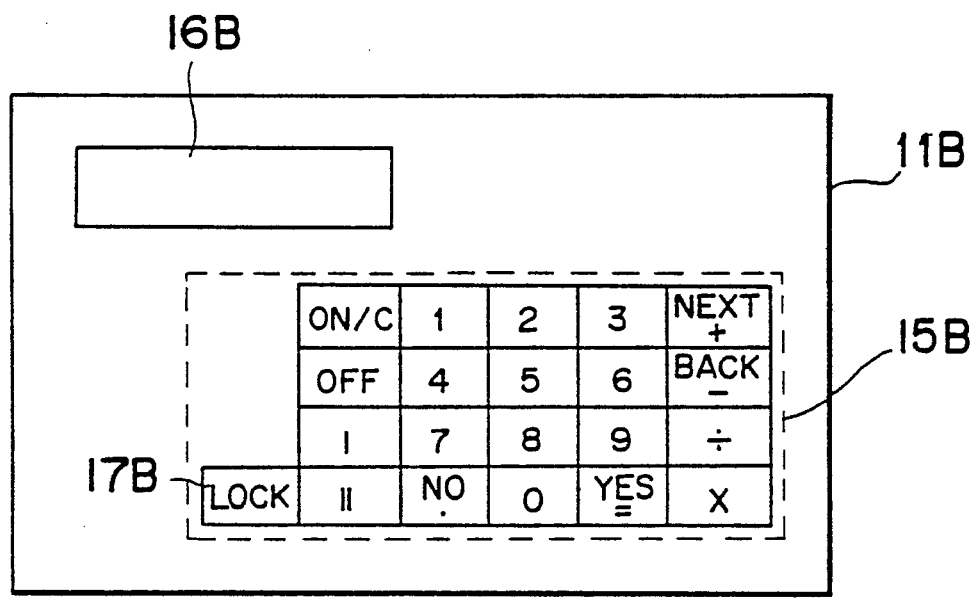
FIG. 3 is a view similar to FIG. 2, which particularly shows a modification thereof.

Referring further to FIG. 3, there is shown an IC card 11B with a display portion according to a modification of the IC card 11 of FIGS. 1 and 2.

Figure 4:
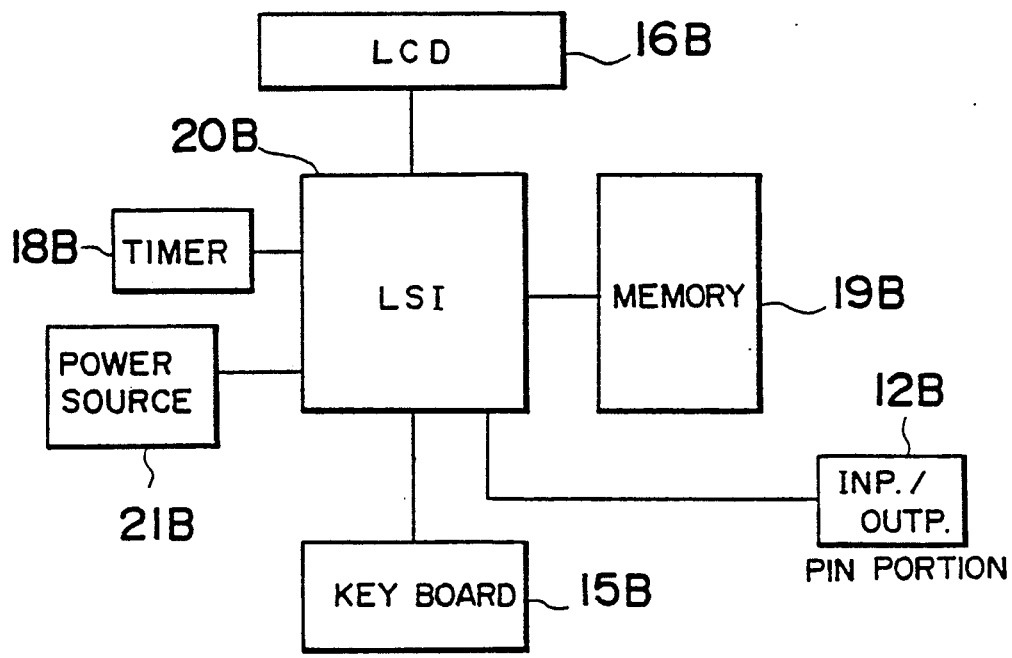
FIG. 4 is a block diagram showing a circuit construction of the IC card in FIG. 3.
Figure 5:
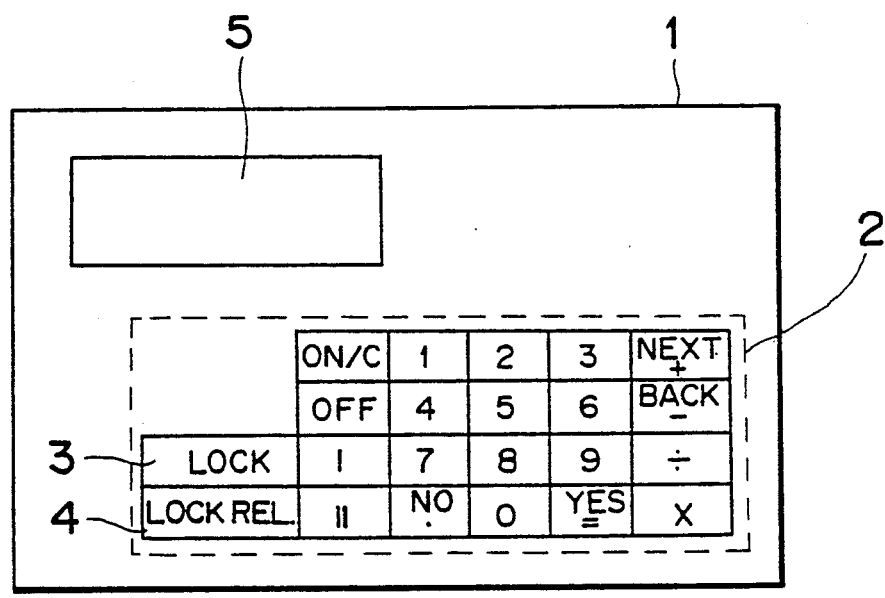
FIG. 5 is a view similar to FIG. 2, which particularly shows a conventional IC card with a display portion (already referred to)
Figure 6:
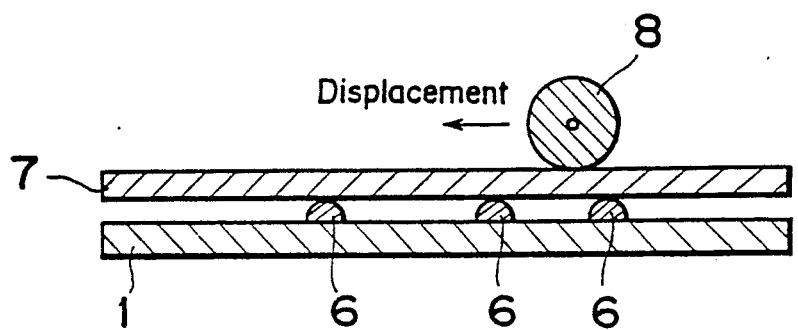
FIG. 6 is a fragmentary cross section for explaining transfer of an embossed code by an imprinter (already referred to).

As shown in a block diagram of FIG. 4 illustrating a circuit construction of the IC card 11B referred to above, said IC card 11B includes an input/output interface, i.e. pin portion 12B provided on the front surface of the IC card 11B, a keyboard 15B provided on the reverse surface of the IC card 11B, a display portion, i.e. liquid crystal display unit (LCD) 16B similarly disposed on the reverse surface, a memory 19B for storing information inputted from the input/output interface 12B or results of calculation, a timer 18B for measuring the key-lock time according to the present invention, and a power source 21B, all of which are connected to a large scale integrated circuit (LSI) 20B having a central processing unit (CPU) and the like for controlling the input/output interface 12B, the keyboard 15B, the liquid crystal display unit 16B, the timer 18B and the memory 19B.

The IC card 11B with a display portion 16B according to the modification of the present invention is subjected to the key-lock in the manner as follows.

Specifically, for effecting the key-lock, time period desired to be key-locked is first inputted through the keyboard 15B. In other words, upon depression, for example, of the key "6" and key "0", the key-lock time of 60 seconds is designated, and when the "LOCK" key is depressed finally, the key-lock time period of 60 seconds is set in the timer 18B, whereby the key-lock is effected to enter the key-lock mode, during which mode, no key input will be accepted.

Thereafter, when the timer 18B detects that the time which has elapsed after entering the key-lock mode, has reached 60 seconds, the key-lock mode is automatically released based on the detection signal from the timer 18B so as to establish the lock release mode.

Accordingly, even if the keys of he keyboard 15B are depressed by the roller during insertion of the IC card 11B into the ATM or during transfer of the embossed code of the IC card 11B by the imprinter, there is no possibility that the key-lock is undesirably released. In other words, even when the IC card 11B is inserted into the ATM or imprinter, the key-lock is never released for erroneous functioning. It is to be noted here that the detection of depression of the "LOCK" key, entry into the key-lock mode, releasing of the key-lock based on the lapse of time, etc., are effected through control by the CPU.

In the IC card 11B, it is so arranged to designate the key-lock time by the key input from the keyboard 15. However, the present invention is not limited in its application, to such arrangement alone, but may be so modified, for example, that the key-lock mode is continued for a predetermined period of time preliminarily set in the timer 18B by depressing the "LOCK" key. In short, the set time of the timer is adapted to be longer than a functioning time from insertion of the IC card 11B into the ATM or imprinter up to the withdrawal thereof.

As is clear from the foregoing description, in one aspect, since the key-lock system according to the present invention is so arranged that the key-lock state is established when the plurality of keys of the keyboard are depressed in the predetermined order, while the lock release state is set up when the plurality of keys are depressed in another predetermined order, if the order for depressing the plurality of keys is so set that the keys are not depressed by the function other than the lock releasing function such plurality of keys are not depressed by such another predetermined order by the function other than that for the lock releasing. Accordingly, if the key-lock is effected by the key-lock system of the present invention, there is no possibility that the key-lock is undesirably released by the function other than the lock releasing for erroneous functions.

Furthermore, in another aspect of the present invention, the key-lock system is so arranged that the key-lock state is established when the predetermined keys of the keyboard are depressed, while upon arrival at the time point at which the elapsing time after establishment of the key-lock state is designated, the lock release state is established, and thus, the key-lock state is never released even when the keys of the keyboard are depressed until the elapsing time for the key-lock state reaches the above designated time point. Accordingly, when the key-lock is effected by the key-lock system of the present invention, there is no possibility that the key-lock is undesirably released by the function other than the lock releasing for erroneous function.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A key-lock system for use in an IC card with a display portion which comprises means for rendering input from a keyboard so that said keyboard is placed in an inhibited state by detecting that a plurality of keys, comprising at least three keys including a specific key for effecting a key-lock release, of said keyboard were depressed in a first predetermined order, and means for removing the inhibited state of input from said keyboard by detecting that the plurality of keys of the keyboard were depressed in a second predetermined order; whereby the removal of the inhibited state of input is effected by detecting that the appropriate keys were depressed in the second predetermined order.

2. A key-lock system for use in an IC card with a display portion which comprises means for rendering input from a keyboard so that said keyboard is placed in an inhibited state for a certain period of time by detecting that predetermined keys of the keyboard were depressed, the predetermined key depression setting said certain period of time, and means for removing the inhibited state of input from the keyboard by detecting that the time which has elapsed after the keyboard was rendered to the inhibited state has equalled a time specified at the time the keyboard was inhibited.

3. The key-lock system according to claim 1 wherein the plurality of keys of the keyboard are depressed in the first and second predetermined orders such that a roller travelling across the card in a constant direction and depressing keys of the keyboard will depress the keys in an order different than the first and second predetermined orders.

4. The key-lock system according to claim 1 wherein the second predetermined order of depressing the plurality of keys is derived by inverting the first predetermined order of depressing the plurality of keys with the exception of said specific key.

5. A method of effecting a key-lock system for use in an IC card with a display portion which comprises means for rendering input from a keyboard, comprising the steps of:
a) monitoring an IC card keyboard for the depression of a plurality of keys of said keyboard in a first predetermined order;
b) placing said keyboard in an inhibited state upon detection of the depression of the plurality of keys in said first predetermined order;
c) monitoring said keyboard for the depression of a plurality of keys in a second predetermined order; and
d) releasing said keyboard from the inhibited state upon detection of the depression of the plurality of keys in the second predetermined order.

6. A method of effecting a key-lock system for use in an IC card with a display portion which comprises means for rendering input from a keyboard, the method comprising the steps of:
a) monitoring the keyboard for the depression of a plurality of keys of the keyboard in a predetermined order, the predetermined order of keystrokes including information specifying an amount of time that the keyboard is to be inhibited;
b) placing the keyboard in an inhibited state upon detection of the depression of the plurality of keys in the predetermined order; and
c) releasing the keyboard from the inhibited state upon detecting that the time which has elapsed after placing the keyboard in the inhibited state has reached the specified time.

* * * * *